(12) United States Patent
Van Berlo

(10) Patent No.: US 8,790,481 B2
(45) Date of Patent: Jul. 29, 2014

(54) MANUFACTURING PROCESS

(75) Inventor: Patrick Petrus Antonius Maria Van Berlo, Cambridge (NZ)

(73) Assignee: Corcel IP Limited (NZ)

( * ) Notice: Subject to any disclaimer, the term of this patent is extended or adjusted under 35 U.S.C. 154(b) by 580 days.

(21) Appl. No.: 13/122,380

(22) PCT Filed: Sep. 29, 2009

(86) PCT No.: PCT/NZ2009/000206
§ 371 (c)(1),
(2), (4) Date: Jun. 22, 2011

(87) PCT Pub. No.: WO2010/039047
PCT Pub. Date: Apr. 8, 2010

(65) Prior Publication Data
US 2011/0244259 A1 Oct. 6, 2011

(30) Foreign Application Priority Data

Oct. 1, 2008 (NZ) ........................ 571716

(51) Int. Cl.
B29C 65/00 (2006.01)
B32B 37/00 (2006.01)
B32B 38/04 (2006.01)
B32B 27/00 (2006.01)

(52) U.S. Cl.
USPC ........... 156/256; 156/182; 156/264; 156/292; 156/332

(58) Field of Classification Search
USPC ........... 156/60, 182, 196, 199, 200, 201, 205, 156/207, 210, 212, 215, 250, 256, 259, 260, 156/263, 264, 269, 271, 292, 325, 326, 327, 156/332, 349, 510, 446, 512, 516, 517, 538, 156/539, 556, 559, 563
See application file for complete search history.

(56) References Cited

U.S. PATENT DOCUMENTS

| 4,158,712 A | 6/1979 | Degens et al. |
| 4,348,250 A | 9/1982 | Bromley |

(Continued)

FOREIGN PATENT DOCUMENTS

| CN | 2299711 Y | 12/1998 |
| CN | 1322622 A | 11/2001 |

(Continued)

OTHER PUBLICATIONS

Search Report in Chinese Patent Application No. 200980130380.8, dated Feb. 6, 2013.

(Continued)

Primary Examiner — Philip Tucker
Assistant Examiner — Brian R Slawski
(74) Attorney, Agent, or Firm — Knobbe Martens Olson & Bear LLP

(57) ABSTRACT

The present invention relates to a method of forming a board from a number of substantially planar layers, including the steps of
a) ensuring a layer is positioned substantially in a horizontal plane; and
b) applying adhesive to the layer; and
c) moving the layer to a holding station; and
d) holding the layer horizontally against another layer within the holding station; and
e) repeating steps a) to d) until a stack of layers is formed having a height substantially equivalent to the desired width of the board to be formed;
the method characterized by the step of
f) removing the stack from the holding device once the layers have had sufficient time to bond to each other.

8 Claims, 2 Drawing Sheets

(56) References Cited

U.S. PATENT DOCUMENTS

| | | | |
|---|---|---|---|
| 4,542,566 A | | 9/1985 | Sukenik |
| 4,561,918 A | * | 12/1985 | Scharfenberg et al. ......... 156/78 |
| 5,383,999 A | * | 1/1995 | Kuo ............................. 156/267 |
| 5,681,641 A | | 10/1997 | Grigsby et al. |
| 2002/0064629 A1 | * | 5/2002 | Yoshii .......................... 428/184 |

FOREIGN PATENT DOCUMENTS

| | | |
|---|---|---|
| CN | 2551445 Y | 5/2003 |
| DE | 10 2005 052 691 | 3/2007 |
| FR | 1 373 515 | 10/1963 |
| JP | S40-015273 | 7/1965 |
| JP | S62-214944 | 9/1987 |
| JP | H10-511904 | 11/1998 |
| JP | 11-207839 A | 8/1999 |
| WO | WO 98/04401 | 2/1998 |
| WO | WO 2007/025707 A1 | 3/2007 |

OTHER PUBLICATIONS

Search Report in Chinese Patent Application No. 200980139043.5, dated Feb. 3, 2013.
International Search Report issued in corresponding PCT Application No. PCT/NZ2009/000206, mailed Jan. 18, 2010.
Written Opinion of the International Searching Authority for PCT/NZ2009/000206, mailed Jan. 18, 2010.
International Preliminary Report on Patentability for PCT/NZ2009/000206, completed May 13, 2010.
Office Action mailed Oct. 1, 2013 in Japanese Patent Application No. 2011-530015.

* cited by examiner

MANUFACTURING PROCESS

This application is the U.S. National Phase under 35 U.S.C. §371 of International Application PCT/NZ2009/000206, filed Sep. 29, 2009, designating the U.S., and published in English as WO 2010/039047 on Apr. 8, 2010, which claims priority to New Zealand Application No. 571716, filed Oct. 1, 2008, the entire contents of which are incorporated herein by reference.

TECHNICAL FIELD

This invention relates to a method of manufacturing.

In particular, the present invention relates to a method of manufacturing boards from layered material.

BACKGROUND ART

The present invention will be referred to as being in relation to a manufacturing method suitable for making multi-layer boards. While reference throughout the specification should be made to use of the present invention in relation to corrugated paperboards, it should be appreciated that the principles of the present invention can be applied to materials other than paper and configurations other than corrugations.

Single face corrugated paperboard is very well known and is used extensively in the industry, especially in packaging where it is used as protective padding and wrapping. It is also used as the basic components in the production of many structural objects such as boxes, panels, pallets, etc.

Sheets of single face corrugated paperboard can be bonded together to form multi-layer corrugated paperboards of various thicknesses and strength. One reason for the wide use of such paperboard is that it is relatively lightweight and has considerable rigidity and strength.

Single face corrugated paperboard is usually made by bonding a fluted sheet, typically of corrugating medium (generally recycled paper) onto a liner sheet. The liner sheet is typically Kraft paper although other materials may be used.

However, in typical manufacturing process the boards are made such that the flute troughs and peaks are positioned substantially horizontally. This means that weight bearing on the surface of the board can act to flatten out the corrugations or flutes and crush the board. Therefore, it will be desirable if there could be found a manufacturing process that enables the board to be used in such a way that greater strength could be obtained.

One method by which this can be achieved can be to have multiple layers of boards, however there are considerable problems associated with ensuring that the layers of board are held together. Due to the fragile nature of the boards, the layers cannot merely be pressed together via friction fit or some other mechanical means. Instead, chemical bonding is required in the form of the application of an adhesive between the layers.

In order to be effective, the adhesive needs time to cure. Unfortunately, when it is desired to have a rapid production process, this curing time represents a significant bottleneck in the production process.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

According to one aspect of the present invention there is provided a method of forming a board from a number of substantially planar layers, including the steps of:
a) ensuring a layer is positioned substantially in a horizontal plane; and
b) applying adhesive to the layer; and
c) moving the layer to a holding station; and
d) holding the layer horizontally against another layer within the holding station; and
e) repeating steps a) to d) until a stack of layers is formed having a height substantially equivalent to the desired width of the board to be formed;
the method characterised by the step of
f) removing the stack from the holding device once the layers have had sufficient time to bond to each other.

According to another aspect of the present invention there is provided a holding station configured for use with the present method including
at least two opposed planar sections configured to apply sideways pressure on the stack of layers.

According to yet another aspect of the present invention there is provided a board made in accordance with the previous method.

In preferred embodiments of the present invention, the substantially planar layers are single face corrugated board, whether multi-laminated or singular. However, this should not be seen as limiting. Principles of the present invention can apply to layers of various types of material. For example, layers may be made from paper, card, plastics, aluminium, and so forth.

The layers may not necessarily have corrugations and can in some embodiments have cells of other configurations or be substantially solid. It should be noted, however, the invention has particular advantages when used with corrugated board as can be seen later on in the specification.

It is envisaged that in preferred embodiments the layers are relatively thin and possibly having limited structural strength requiring support from underneath. Therefore, it is envisaged that the layer being positioned in substantially the horizontal plane will enable the layer to be supported by parts of the equipment used in the present invention. For example, the layers may be supported by conveyors that act to take the layers to the various stages of a manufacturing process.

The adhesive may be applied to the layer by various means. In one embodiment, the conveyor carries the layer to glue rollers that apply the adhesive.

The horizontal position of the board helps with the even application of the glue which could run if applied in a different orientation.

The adhesive may be applied by other means, for example sprayed.

The type of adhesive used is envisaged to be one that can be readily applied at room temperature and cure relatively quickly at the same temperature. The adhesive also needs to be suitable for the material from which the board is made.

In a preferred embodiment the adhesive is a water-based dispersion containing vinyl acetate copolymer.

A water-based adhesive containing vinyl acetate copolymer in dispersion may be preferred as, under normal use, it is a non-hazardous substance, and therefore can be used safely provided normal ventilation is provided.

Vinyl acetate copolymer dispersions may be relatively quick setting, have a low viscosity, good adhesion and a long open time. A relatively low viscosity is required to allow the adhesive to flow readily, (e.g., when being transferred from a roller to a board) while a good adhesion provides the ability to adhere quickly to a surface.

The open time is a measure of the time, under normal temperature and pressure, that the adhesive can have an exposed surface before it loses its ability to wet the opposing surface and penetrate into the opposing surface fibres.

Preferably the adhesive is Adhesin™ Z9129W, a vinyl acetate copolymer supplied by Henkel New Zealand Limited. The applicant has found that Adhesin™ Z9129W has the required viscosity, and long open time required for use with the present invention. For example, Adhesin™ Z9129W has a viscosity in the range 2100-2200 m·Pa·S and an open time of between 0.5 to 1 minute. However, it is envisaged that other adhesives having similar properties may also be used.

It is envisaged that if rollers are used to apply adhesive to the board, then the very motion of conveying the layers to the rollers and moving them across is an effective way to move the board to the holding station.

While the holding station could take a variety of forms, the preferred embodiments the holding station is merely a pair of opposed planar sections (or panels) that can apply sideways pressure to the stack of boards contained therebetween. For example, the holding station could be two panels connected to rams that push in against the sides of the layers once they have been dropped within the panels.

It is envisaged that the panels may be angled very slightly outwards at the top and inwards at the bottom. This means that the bottom layer is firmly held as a stop and support for subsequent layers to be placed on top of it. This is because in preferred embodiments there is no base to the holding station. As further layers are added to the stack of boards within the holding station, the angle can be lessened so that greater pressure can be applied to the lower boards while still allowing entry of the upper boards.

In some embodiments, the mere assistance of gravity may be sufficient to cause the layers to be pushed firmly against each other sufficient to cause the adhesive to bond the boards together tightly.

However, in preferred embodiments there is provided additional pressure to hold the layers against each other. In one embodiment this may be in the form of a plate that is configured to descend from above and pushes down upon each layer after it is held by the panels. This causes the layer to press against the lower layer beneath it. Therefore, if the adhesive is applied to the underside of a layer before it enters the holding station, the pressing plate ensure that that adhesive pushes against the clean upper side of the layer beneath.

Further, by having adhesive only applied to the underside of the layers, the pressing plate does not encounter adhesive itself, thus creating a much cleaner operation.

The pressing plate may be operated by a number of means, but in preferred embodiments this is by the even application of pressure through pressing rams.

Layers will be fed into the holding station until they have formed a stack of layers having a height substantially equivalent to the desired width of the ultimate board to be formed.

This is because, once the individual layers have had time to bond to each other, the whole stack is released from the holding station and can form the basis of multiple sheets of vertical flute corrugated board.

This can be achieved by a number of ways. In one embodiment, the stack exiting the holding station is a solid cube which is then subsequently cut vertically to form vertical flute corrugated boards.

In preferred embodiments however, the horizontally positioned layers are cut into strips prior to entering the squeeze box, prior to passing over the glue rollers. This is a far easier task to achieve than cutting a whole stack as described above. Instead, thin layers can be readily cut with blades as discussed in the applicant's New Zealand Patent Application No. 570795.

It can be seen that if the layers are cut before entering the holding station, then the action and positioning of the panels of the holding station do need to be well controlled to ensure that the cuts are aligned with each other.

It can also be seen that this method of production addresses a number of the problems of the prior art.

Firstly, although it is still the requirement to hold the layers while the adhesive dries, this is not so much of a bottleneck as multiple boards are being formed at one time.

Further, the effective reorientation to create boards having vertical flutes lead to a much stronger board. This is because the weight bearing surfaces are end on to the sides of the flutes, rather than on the crests of the corrugations as with previous boards. Which gives it substantial greater strength to the boards.

The provision of a very simple holding station having just two side panels is very cost effective to manufacture and operate.

The combination of the horizontal feeding of the layers which are cut and glued and then pressed vertically before emerging from the holding station as a vertical flute board is a very stream lined efficient process.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
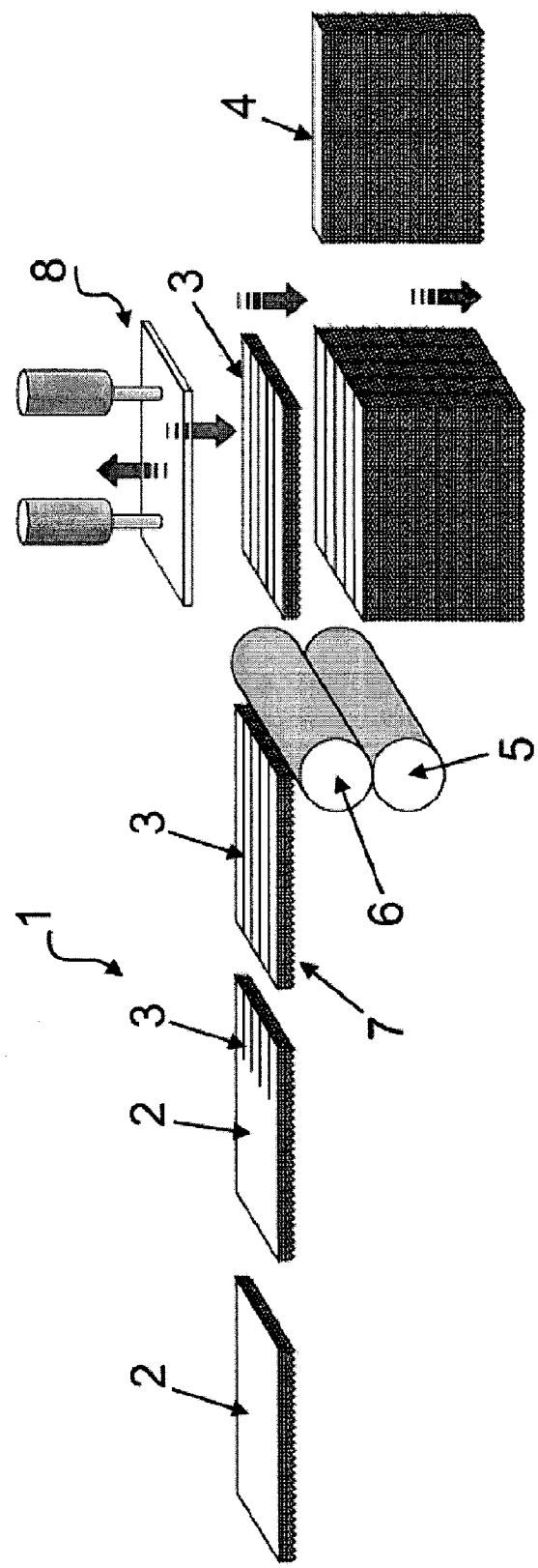
FIG. 1 is an overview of the board manufacturing process in accordance with the present invention.

With respect to FIG. 1, there is illustrated a board manufacturing process generally indicated by arrow (1) in accordance with one embodiment of the present invention.

The board manufacturing process (1) has been illustrated as having five sections A to E.

In Section A, a sheet (2) of multi-laminated single face corrugated board (or layer) is conveyed on a conveyor (not shown) to Section B which is the cutting section. The board (2) is cut into strips (3) by blades (not shown). The width of each strip is equal to the resultant thickness of the board (4) which is ultimately produced by the manufacturing process (1).

The strips (3) are then feed via conveyor to the Section C which includes glue rollers (5 and 6). The rollers (5 and 6) apply adhesive to the underside (7) of the strips (3).

Figure 2:
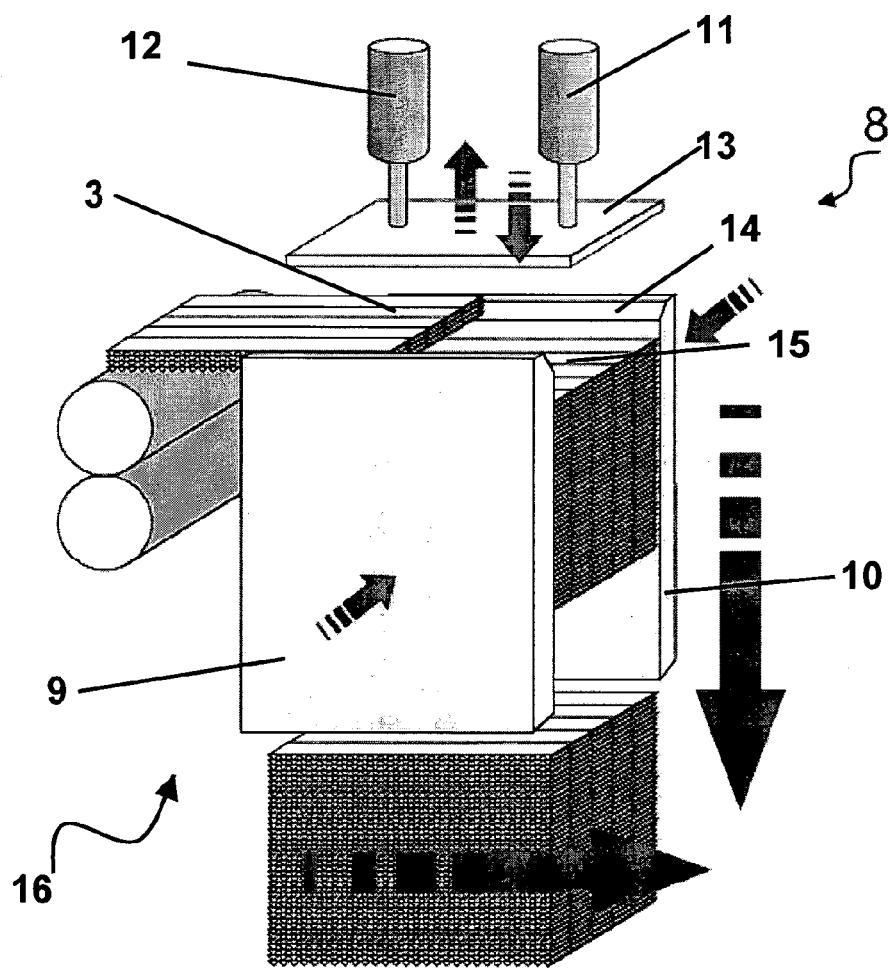
FIG. 2 illustrates the action of the holding station.

The strips (3) are then feed to Section D which is in the form of a holding station generally indicated by arrow (8). Section D is more clearly illustrated in FIG. 2.

It should be noted that the top of the panels (9 and 10) has a taper (14 and 15) which assists in the guiding of the strips (3) into the holding station (8).

The strips (3) are dropped into the holding station (8) and are held between two side panels (9 and 10). The panels are connected to rams (not shown) which exert a squeezing action on the sides of the strips (3). It can be seen that the strips (3) between the panels (9 and 10) are fully aligned with each other.

After a layer of strips enters the holding station (8), pressing rams (11 and 12) push down a plate (13) which causes the strips (3) to come into close contact with the strips below.

The stack of layers generally indicated by arrow (16) is dropped out of the holding station (8) through the action of the panels (9 and 10) moving apart, once
a) sufficient strips have been loaded into the station so that the stack of strips is of a height equivalent to the length of the board (4) to be produced, and
b) the adhesive has bonded the strips.

In other embodiments the stack (16) is lifted upwards out of the holding station (8). In this embodiment the glue is applied to the upper side of the layers.

The completed boards (4) are then removed therefrom.

Aspects of the present invention have been described by way of example only and it should be appreciated that modifications and additions may be made thereto without departing from the scope of the appended claims.

I claim:

1. A method of forming a board from a number of substantially planar layers, comprising:
    a) ensuring a layer is positioned substantially in a horizontal plane;
    b) applying an adhesive to the layer;
    c) moving the layer to a holding station, the holding station comprising:
        at least two opposed planar sections configured to apply sideways pressure on the stack of layers; and
        a plate configured to descend from above the planar sections;
    d) holding the layer horizontally against another layer within the holding station;
    e) pressing the plate down on each layer as it is held by the planar sections in the holding station;
    repeating a) to e) until a stack of layers is formed having a height substantially equivalent to the desired width of the board to be formed; and
    f) removing the stack from the holding station device once the layers have had sufficient time to bond to each other.

2. A method as claimed in claim 1 wherein the layers are single faced corrugated board.

3. A method as claimed in claim 1 wherein the layers are supported in the horizontal plane.

4. A method as claimed in claim 3 wherein the support provided for the layers in the horizontal plane is provided by a conveyor.

5. A method as claimed in claim 1 wherein the adhesive is applied by a glue roller.

6. A method as claimed in claim 1 wherein the adhesive is water based and includes a vinyl acetate copolymer in dispersion.

7. A method as claimed in claim 1 wherein the adhesive is applied to the underside of the layers.

8. A method as claimed in claim 1 wherein the planar layers are cut into strips prior to ensuring that the layer is positioned substantially in a horizontal plane.

* * * * *

UNITED STATES PATENT AND TRADEMARK OFFICE
CERTIFICATE OF CORRECTION

| | | |
|---|---|---|
| PATENT NO. | : 8,790,481 B2 | Page 1 of 1 |
| APPLICATION NO. | : 13/122380 | |
| DATED | : July 29, 2014 | |
| INVENTOR(S) | : Patrick Petrus Antonius Maria Van Berlo | |

It is certified that error appears in the above-identified patent and that said Letters Patent is hereby corrected as shown below:

In the Specification

In column 4 line 1, Change "that that" to --that--.

In the Claims

In column 6 line 18 (approx.), Claim 1, before "repeating" insert --f)--.

In column 6 line 21, Claim 1, change "f)" to --g)--.

In column 6 line 21, Claim 1, after "station" delete "device".

Signed and Sealed this
Seventeenth Day of March, 2015

Michelle K. Lee
*Director of the United States Patent and Trademark Office*